Aug. 13, 1946.                F. E. ALTMAN                 2,405,729
                         FOUR-COMPONENT OBJECTIVE
                         Filed Nov. 20, 1943            2 Sheets-Sheet 1

FIG. 1.

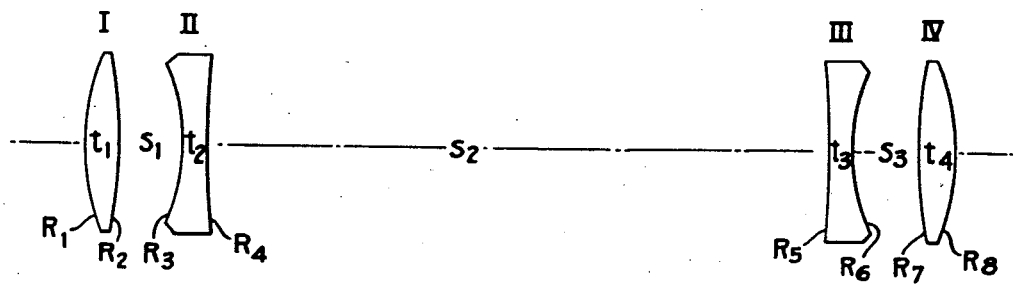

FIG. 2.

| HALF SYSTEM: EF=100 mm; f/7.0; | | | Ptz = +.0008 | |
|---|---|---|---|---|
| LENS ELEMENTS | $N_D$ | V | RADII | THICKNESSES |
| I & IV | 1.611 | 57.2 | $+R_1=-R_8 = 29.6$ | $t_1 = t_4, = 4.3$ |
|  |  |  | $-R_2=+R_7 = 52.0$ | $S_1 = S_3, = 8.2$ |
| II & III | 1.649 | 33.8 | $-R_3=+R_6 = 24.4$ | $t_2 = t_3, = 2.6$ |
|  |  |  | $+R_4=-R_5 = 123.5$ | $S_2 = 77.5$ |

FIG. 3.

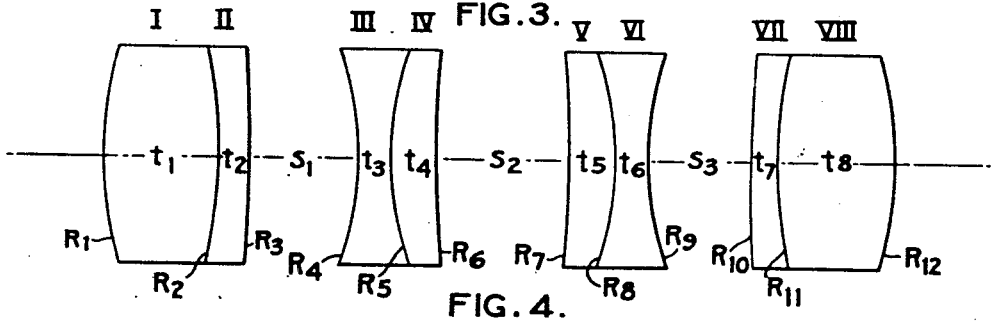

FIG. 4.

| HALF SYSTEM: EF=100 mm; f/7.0; | | | Ptz = -.0026 | |
|---|---|---|---|---|
| LENS ELEMENTS | $N_D$ | V | RADII | THICKNESSES |
| I & VIII | 1.744 | 45.8 | $+R_1=-R_{12} = 34.6$ | $t_1=t_8 = 10.7$ |
| II & VII | 1.720 | 29.3 | $-R_2=+R_{11} = 45.1$ | $t_2=t_7 = 2.6$ |
|  |  |  | $-R_3=+R_{10} = 138.6$ | $S_1=S_3 = 9.8$ |
| III & VI | 1.617 | 36.6 | $-R_4=+R_9 = 29.3$ | $t_3=t_6 = 3.3$ |
| IV & V | 1.620 | 60.3 | $+R_5=-R_8 = 29.3$ | $t_4=t_5 = 4.1$ |
|  |  |  | $+R_6=-R_7 = 75.2$ | $S_2 = 12.2$ |

FRED E. ALTMAN
INVENTOR
BY
ATTY & AGT

Aug. 13, 1946.   F. E. ALTMAN   2,405,729
FOUR-COMPONENT OBJECTIVE
Filed Nov. 20, 1943   2 Sheets-Sheet 2

FIG. 5.

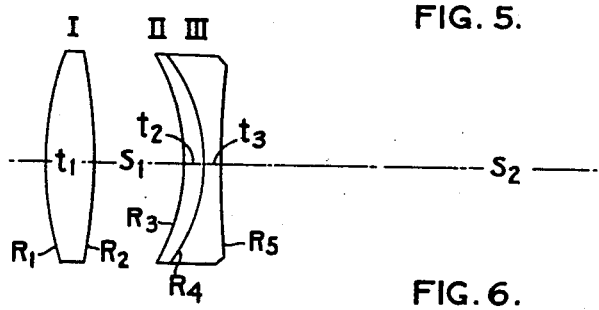
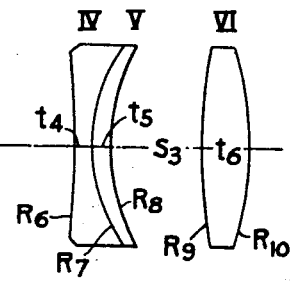

FIG. 6.

| HALF SYSTEM: | | EF = 100 mm., | f/6.7; | Pt₂ = −.0007 | |
|---|---|---|---|---|---|
| LENS ELEMENTS | $N_D$ | V | RADII | | THICKNESSES |
| I & VI | 1.617 | 55.0 | $+R_1 = -R_{10}$ = | 30.6 | $t_1 = t_6$ = 4.25 |
|  |  |  | $-R_2 = +R_9$ = | 49.2 | $S_1 = S_3$ = 8.6 |
| II & V | 1.697 | 56.1 | $-R_3 = +R_8$ = | 20.9 | $t_2 = t_5$ = 1.7 |
| III & IV | 1.617 | 38.5 | $-R_4 = +R_7$ = | 13.4 | $t_3 = t_4$ = 1.7 |
|  |  |  | $+R_5 = -R_6$ = | 109.9 | $S_2$ = 100.5 |

FIG. 7.

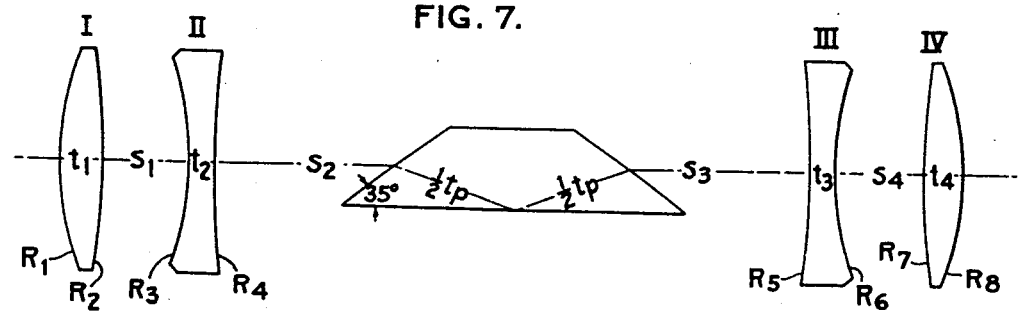

FIG. 8.

| HALF SYSTEM: | | EF = 100 mm., | f/7.8 | Pt₂ = +.0009 | |
|---|---|---|---|---|---|
| LENS ELEMENTS | $N_D$ | V | RADII | | THICKNESSES |
| I & IV | 1.611 | 57.2 | $+R_1 = -R_8$ = | 28.2 | $t_1 = t_4$ = 3.65 |
|  |  |  | $-R_2 = +R_7$ = | 58.9 | $S_1 = S_4$ = 8.25 |
| II & III | 1.649 | 33.8 | $-R_3 = +R_6$ = | 24.9 | $t_2 = t_3$ = 2.2 |
|  |  |  | $+R_4 = -R_5$ = | 121.7 | $S_2 = S_3$ = 18.2 |
| PRISM | 1.611 | 57.2 |  |  | $t_p$ = 32.2 |

FRED E. ALTMAN
INVENTOR
BY
ATTY & AG'T

Patented Aug. 13, 1946

2,405,729

UNITED STATES PATENT OFFICE 2,405,729

FOUR-COMPONENT OBJECTIVE

Fred E. Altman, Rochester, N. Y., assignor to Eastman Kodak Company, Rochester, N. Y., a corporation of New Jersey Application November 20, 1943, Serial No. 511,060

14 Claims. (Cl. 88—57)

This invention relates to four component objective lenses.

An object of my invention is to provide an objective with critically sharp definition at the axis, especially when used at finite conjugates, and with a reduced Petzval sum.

A particular object of my invention is to provide an objective suitable for use as a relay lens in an optical sighting device.

An object of a preferred feature of my invention is to provide a relay lens with a negative Petzval sum and suitable for use in sighting devices according to my copending application, Serial No. 511,062, filed concurrently herewith.

By "relay lens" is meant an objective lens with real object and image at finite conjugates and without any intermediate real images, the "real object" being an image formed by another lens or other lenses in front of the relay lens. The expression "real object and image" is used in a strictly technical sense meaning an object in front of the front surface and an image behind the rear surface of the relay lens, and may include an object or image which is virtual with respect to the adjacent part of the whole optical system.

Heretofore, relay lenses have usually been made of one or more cemented achromats, the larger the aperture ratio specified, the greater the number of components required so as to keep the zonal spherical aberration within the tolerance permitted by the requirement for a sharp image at the center of the field of view.

The demand for sighting devices with a flatter image and less astigmatism in the field zones away from the axis has led to the proposal of several expedients all of which have drawbacks which have kept them from being generally adopted. However, the present invention overcomes all objections and provides a lens ideally suited to this purpose.

The present invention is an improvement in the type of objective which is made up of two negative components and two positive components in axial alignment forming two halves of the objective, each half consisting of a negative component and a positive component spaced apart by between 0.02$f$ and 0.5$f$ where $f$ is the focal length of the half. This arrangement reduces the Petzval sum of the objective in known manner. When used at unit magnification, the system is preferably symmetrical.

The invention includes features relating to the arrangement and shape of the components, others relating to the compounding of components, and still others relating to the indices of refraction of the elements, all of these features operating to reduce the zonal spherical aberration and thereby producing sharp definition on the axis. The improvement is far beyond anything previously thought to be obtainable, the nearest previous approach being with another type of lens as described in my Patent 1,880,394. Some of these features also further reduce the Petzval sum. The zonal spherical aberration may be corrected by the most preferred shape of components, without making any components compound or by making them compound and with less specific designation of the shape, or again by making them compound and with the preferred feature of high index elements and with still less specific designation of the shapes of the components.

The series of features relating to arrangement and shape, some of which include some or all of the preceding features in the series, are as follows: One, the two negative components are between the two positive components. Two, the outer surface of each component is of the same sign as that of the whole component, that is, concave in the negative and convex in the positive components. By outer surface is meant the surface farther from the other half of the objective. Three, the negative components are biconcave and the positive components biconvex. Four, the outer surface of each biconcave component is more strongly curved than the inner surface. And five, the radius of curvature of the outer surface of each biconcave component is between 0.08 and 0.50 times that of the surface facing toward the other half of the objective. The necessity for these features depends on the degree to which other features are present.

The series of features relating to the compounding of the components is similarly as follows: One, at least one component in each half is compound and consists of a negative element facing toward the other half of the objective and a positive element cemented thereto. Two, the positive element has a higher index than the negative element. Three, at least one component in each half is compound and consists of a negative element cemented to a positive element of higher refractive index in such a way that the cemented surface is convex toward the other half and has positive power. It will be noted that the third feature includes the first two necessarily, that is since the negative element has lower index it must face toward the other half if the cemented surface is to be convex toward the other half and have positive power. Four, the component which is compounded in this manner is specifically the negative component in each half. Five, all four components are compound, at least one in each half of the objective being according to the first two features of this series. And six, all four components are compound, at least one in each half being according to the third feature of this series. As with the shape features, the necessity for these depends on whether or not certain other features are present.

The features relating to the indices of refraction of the elements of compound components are: One, the positive element has an index greater than 1.64. This index can be as high as glasses are available. At present this is about 2.1. Two, all the elements of the objective have refractive indices greater than 1.6. And three, the positive elements in components according to at least the first feature relating to the manner of compounding have refractive indices greater than 1.7. The most preferred embodiment, of course, has all features of all three sets just listed.

By means of the feature of positive elements with index greater than 1.7 combined with at least the second feature of each of the other series, I have succeeded in designing an objective with Petzval sum reduced to a negative value. Such a lens is particularly suitable for use in sighting systems according to my copending application mentioned above.

It is advantageous that the two halves of the objective be spaced apart by between 0.04 F and F where F is the focal length of the whole objective. Observing the lower limit aids in flattening the field, while an upper limit is necessary if vignetting is to be avoided. If a prism or filter glass is to be included in the system, the central space of this relay lens is a convenient place for it because the bundles of rays are parallel or nearly parallel. If a prism or filter is included, the effective separation is taken as the path length in the prism or filter divided by the refractive index plus the sum of the air-spaces.

It is preferred that the objective be symmetrical and corrected for unit magnification, but the invention is not limited to this form.

In the accompanying drawings:

Figs. 1 and 2 show a relay lens consisting of four simple components.

Figs. 3 and 4 show a relay lens consisting of four compound components.

Figs. 5 and 6 show a relay lens consisting of two simple and two compound components.

Figs. 7 and 8 show a symmetrical relay lens with a prism in the central space.

The data shown in Figs. 2, 4, 6, and 8 is repeated here along with additional examples. In each case the unit of length may be taken to be a millimeter, and each example is given on the scale of 100 units focal length to facilitate comparisons.

*Example 1, Figs. 1 and 2*

Half system:  EF=100;  f/7.0  Ptz=+0.0008

| Lens elements | $N_D$ | V | Radii | Thickness |
|---|---|---|---|---|
| I and IV | 1.611 | 57.2 | $+R_1=-R_8=29.6$ | $t_1=t_4=4.3$ |
| II and III | 1.649 | 33.8 | $-R_2=+R_7=52.0$ | $S_1=S_3=8.2$ |
| | | | $-R_3=+R_6=24.4$ | $t_2=t_3=2.6$ |
| | | | $+R_4=-R_5=123.5$ | $S_2=77.5$ |

*Example 2, Fig. 1*

Half system:  EF=100;  f/7.0  Ptz=+0.00191

| Lens elements | $N_D$ | V | Radii | Thickness |
|---|---|---|---|---|
| I and IV | 1.611 | 57.2 | $+R_1=-R_8=27.1$ | $t_1=t_4=4.7$ |
| II and III | 1.617 | 36.6 | $-R_2=+R_7=51.3$ | $S_1=S_3=5.2$ |
| | | | $-R_3=+R_6=26.0$ | $t_2=t_3=2.6$ |
| | | | $+R_4=-R_5=79.1$ | $S_2=19.9$ |

*Example 3, Fig. 1*

Half system:  EF=100;  f/7.0  Ptz=+.0003

| Lens elements | $N_D$ | V | Radii | Thickness |
|---|---|---|---|---|
| I and IV | 1.611 | 57.2 | $+R_1=-R_8=29.5$ | $t_1=t_4=4.25$ |
| II and III | 1.649 | 33.8 | $-R_2=+R_7=51.3$ | $S_1=S_3=8.6$ |
| | | | $-R_3=+R_6=23.6$ | $t_2=t_3=2.6$ |
| | | | $+R_4=-R_5=122.9$ | $S_2=102.0$ |

*Example 4, Figs. 3 and 4*

Half system:  EF=100;  f/7.0  Ptz=−.0026

| Lens elements | $N_D$ | V | Radii | Thickness |
|---|---|---|---|---|
| I and VIII | 1.744 | 45.8 | $+R_1=-R_{12}=34.6$ | $t_1=t_8=10.7$ |
| II and VII | 1.720 | 29.3 | $-R_2=+R_{11}=45.1$ | $t_2=t_7=2.6$ |
| | | | $-R_3=+R_{10}=138.6$ | $S_1=S_3=9.8$ |
| III and VI | 1.617 | 36.6 | $-R_4=+R_9=29.3$ | $t_3=t_6=3.3$ |
| IV and V | 1.620 | 60.3 | $+R_5=-R_8=29.3$ | $t_4=t_5=4.1$ |
| | | | $+R_6=-R_7=75.2$ | $S_2=12.2$ |

*Example 5, Fig. 3*

Half system:  EF=100;  f/7.0  Ptz=−.0026

| Lens elements | $N_D$ | V | Radii | Thickness |
|---|---|---|---|---|
| I and VIII | 1.744 | 45.8 | $+R_1=-R_{12}=33.0$ | $t_1=t_8=7.3$ |
| II and VII | 1.720 | 29.3 | $-R_2=+R_{11}=42.1$ | $t_2=t_7=2.4$ |
| | | | $-R_3=+R_{10}=117.9$ | $S_1=S_3=9.1$ |
| III and VI | 1.617 | 36.6 | $-R_4=+R_9=29.3$ | $t_3=t_6=3.1$ |
| IV and V | 1.620 | 60.3 | $+R_5=-R_8=29.3$ | $t_4=t_5=3.8$ |
| | | | $+R_6=-R_7=60.5$ | $S_2=13.6$ |

*Example 6, Figs. 5 and 6*

Half system:  EF=100;  f/6.7  Ptz=−.0007

| Lens elements | $N_D$ | V | Radii | Thickness |
|---|---|---|---|---|
| I and VI | 1.617 | 55.0 | $+R_1=-R_{10}=30.6$ | $t_1=t_6=4.25$ |
| | | | $-R_2=+R_9=49.2$ | $S_1=S_3=8.6$ |
| II and V | 1.697 | 56.1 | $-R_3=+R_8=20.9$ | $t_2=t_5=1.7$ |
| III and IV | 1.617 | 38.5 | $-R_4=+R_7=13.4$ | $t_3=t_4=1.7$ |
| | | | $+R_5=-R_6=109.9$ | $S_2=100.5$ |

*Example 7, Fig. 5*

Half system:  EF=100;  f/5.0  Ptz=−.0014

| Lens elements | $N_D$ | V | Radii | Thickness |
|---|---|---|---|---|
| I and VI | 1.611 | 58.8 | $+R_1=-R_{10}=30.7$ | $t_1=t_6=7.2$ |
| | | | $-R_2=+R_9=72.3$ | $S_1=S_3=11.7$ |
| II and V | 1.697 | 56.1 | $-R_3=+R_8=21.7$ | $t_2=t_5=5.0$ |
| III and IV | 1.617 | 38.5 | $-R_4=+R_7=14.1$ | $t_3=t_4=2.8$ |
| | | | $+R_5=-R_6=179.2$ | $S_2=16.2$ |

*Example 8, Figs. 7 & 8*

Half system:  EF=100;  f/7.8  Ptz=+.0009

| Lens elements | $N_D$ | V | Radii | Thickness |
|---|---|---|---|---|
| I and IV | 1.611 | 57.2 | $+R_1=-R_8=+28.15$ | $t_1=t_4=3.65$ |
| II and III | 1.649 | 33.8 | $-R_2=+R_7=-58.9$ | $S_1=S_4=8.25$ |
| | | | $-R_3=+R_6=-24.9$ | $t_2=t_3=2.2$ |
| | | | $+R_4=-R_5=+121.7$ | $S_2=S_3=18.2$ |
| Prism | 1.611 | 57.2 | | $t_p=32.2$ |

The following table shows details of the examples embodying features of the invention. Other features are obvious from the drawings and the above tables.

| | Example No. | | | | | | | |
|---|---|---|---|---|---|---|---|---|
| | 1 | 2 | 3 | 4 | 5 | 6 | 7 | 8 |
| F | 181 | 79.0 | 355 | 109 | 105 | 346 | 108 | 128 |
| Separ./F | 0.43 | 0.25 | 0.29 | 0.11 | 0.13 | 0.29 | 0.15 | 0.44 |
| Inner R | | | | | | | | |
| Outer R | 0.20 | 0.30 | 0.19 | 0.26 | 0.21 | 0.19 | 0.12 | 0.20 |
| $N_P-N_N$ | | | | 0.25 | 0.25 | .080 | .086 | |
| Lowest N | 1.611 | 1.611 | 1.611 | 1.617 | 1.617 | 1.617 | 1.611 | 1.611 |

In this table "F" is the focal length of the whole relay lens, "Separ." designates the effective separation of the two halves as previously defined, "Inner R and Outer R" mean the absolute values of the radii of curvature of inner and outer glass-air surfaces respectively of the biconcave components, "NP" and "NN" are the respective refractive indices of a positive element and a negative element which are cemented together, the largest such difference in index being indicated, and the lowest N is shown to indicate the preferred feature of all the refractive indices being greater than 1.60.

The half system focal length is given in the drawings for more accurate comparison with the prior art and between examples. It will be noted that except for Example 2, the whole lens has larger focal length, i. e., less power than either half alone. The fact that these examples are symmetrical and work at unit magnification means that the light between the halves is collimated and hence that the center space is not very critical and in turn that the whole lens focal length may be varied (by changing the central space) without materially affecting the corrections. Hence, the half system focal length is the critical one relative to correction of aberrations.

By way of review of the fundamental theory of the invention, I wish to point out that correction, and ultimately over-correction, of Petzval sum in a lens of this type is best obtained by separating the elements or components as much as possible in each half consistent, of course, with tolerable vignetting of the oblique pencils of light. Secondly, the collective components should have as high an index of refraction as possible, and the negative components should have as low an index as is permissible consistent with the correction of spherical aberration. To assist in the correction of spherical aberration and to permit a certain amount of the color correction to be provided in each component separately, the preferable form of the invention has each component compound. That is, the correction of color became increasingly difficult with increased spacing and the lowering of the index in the negative component, but this was best solved by making the negative components compound and hyperchromatic.

The characteristic features of my invention are best described by the accompanying claims.

What I claim and desire to secure by Letters Patent of the United States is:

1. An objective lens consisting of four components in axial alignment forming two halves which are optically spaced apart by between 0.04 F and F where F is the focal length of the objective, each half consisting of a biconcave component and a biconvex component spaced apart by between 0.02 $f$ and 0.5 $f$ where $f$ is the focal length of the half, the biconcave component facing the other half of the lens, characterized by the radius of curvature of that surface of each biconcave component which faces the biconvex component being between 0.08 and 0.50 times that of the surface which faces the other half of the objective.

2. A lens according to claim 1 which is symmetrical with respect to the central space.

3. A lens according to claim 1 in which at least one component in each half is compound and consists of a negative element facing toward the other half of the objective and a positive element with higher refractive index cemented thereto.

4. An objective lens consisting of four components in axial alignment forming two halves which are effectively spaced apart by between 0.04 F and F where F is the focal length of the objective, each half consisting of a biconcave component facing the other half of the objective and a biconvex component spaced therefrom by between 0.02 $f$ and 0.5 $f$ where $f$ is the focal length of the half, characterized by the radius of curvature of that surface of each biconcave component which faces the biconvex component being less than that of the surface which faces the other half of the objective and by one component in each half being compound and consisting of a negative element facing toward the other half of the objective and a positive element with higher refractive index cemented thereto.

5. A lens according to claim 4 in which the refractive index of said positive element is greater than 1.64.

6. A lens according to claim 4 in which all four components are compound.

7. A symmetrical objective lens consisting of four components in axial alignment forming two equal halves which are effectively spaced apart by between 0.04 F and F where F is the focal length of the objective, each of the equal halves consisting of a biconcave component and a biconvex component, the biconcave component being nearer the other half, characterized by at least one component in each half being compound and consisting of a negative element cemented to a positive element of higher refractive index and by the cemented surface being convex toward the other half and having positive power.

8. An objective lens consisting of four components in axial alignment forming two halves which are effectively spaced apart by between 0.04 F and F where F is the focal length of the objective, each half consisting of a negative component facing the other half of the objective and a positive component spaced therefrom by between 0.02 $f$ and 0.5 $f$ where $f$ is the focal length of the half, that surface of each component which faces away from the other half being of the same sign as the whole component, characterized by each negative component being compound and consisting of a negative element facing the other half and a positive element with higher refractive index cemented thereto.

9. A lens according to claim 8 in which the said positive element of each negative component has a refractive index greater than 1.64.

10. An objective lens comprising four components in axial alignment forming two halves which are effectively spaced apart by between 0.04 F and F where F is the focal length of the objective, each half consisting of a negative component facing the other half and a positive component spaced therefrom by between 0.02 $f$ and 0.5 $f$ where $f$ is the focal length of the half, that surface of each component which faces away from the other half being of the same sign as the whole component, characterized by having all the four components compound each including a positive and a negative element and by two components of like sign being cemented doublets, each consisting of a negative element facing the other half of the objective and a positive element of higher index cemented thereto.

11. An objective according to claim 10 in which the positive element of each of the said two cemented doublets has a refractive index greater than 1.7 and a dispersive index greater than 35.

12. An objective lens comprising two dispersive doublets spaced between two collective doublets, the central space being less than F and the outer two spaces being less than 0.5 F, where F is the focal length of the objective, each doublet consisting of a negative element cemented to a positive element, in which the positive elements of the outer components are biconvex, face outward, and have a higher refractive index than that of the negative components cemented thereto.

13. An objective lens consisting of four components in axial alignment forming two halves which are effectively spaced apart by between 0.04 F and F where F is the focal length of the objective, each half consisting of a negative component facing the other half of the objective and a positive component spaced therefrom by between 0.02 $f$ and 0.5 $f$ where $f$ is the focal length of the half, that surface of each component which faces away from the other half being of the same sign as the whole component, characterized by at least one component in each half being a cemented doublet consisting of a positive element with refractive index greater than 1.7 facing away from the other half of the objective and a negative element with refractive index less than that of the positive element.

14. A lens according to claim 13 for use as a relay lens in a sighting device and having a negative Petzval sum.

FRED E. ALTMAN.